(12) United States Patent
Kim (10) Patent No.: US 10,061,075 B2
(45) Date of Patent: Aug. 28, 2018

(54) LIGHT GUIDE DEVICE

(71) Applicant: Hyundai Motor Company, Seoul (KR)

(72) Inventor: Hyeong Seon Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 29 days.

(21) Appl. No.: 15/198,484

(22) Filed: Jun. 30, 2016

(65) Prior Publication Data

US 2017/0108637 A1    Apr. 20, 2017

(30) Foreign Application Priority Data

Oct. 19, 2015 (KR) ......................... 10-2015-0145381

(51) Int. Cl.
*F21V 7/04*    (2006.01)
*F21V 8/00*    (2006.01)

(52) U.S. Cl.
CPC ......... *G02B 6/0076* (2013.01); *G02B 6/0036* (2013.01); *G02B 6/0043* (2013.01)

(58) Field of Classification Search
CPC .. G02B 6/0075; G02B 6/0076; G02B 6/0078; G02B 6/0036; G02B 6/0043; G02B 6/0031; G02B 6/133555; G02B 6/133605; G02B 6/133557; G02B 6/0051; G02B 6/0053; H04N 1/02835
USPC ................................ 362/609, 616, 623, 624
See application file for complete search history.

(56) References Cited

U.S. PATENT DOCUMENTS

| | | | | |
|---|---|---|---|---|
| 2006/0146573 A1* | 7/2006 | Iwauchi | ............... | G02B 6/0018 362/621 |
| 2008/0137005 A1* | 6/2008 | Kim | .................... | G02B 6/0055 349/64 |
| 2012/0120679 A1* | 5/2012 | Shih | ....................... | C09D 11/03 362/609 |

FOREIGN PATENT DOCUMENTS

| | | |
|---|---|---|
| JP | 2005-353599 A | 12/2005 |
| JP | 2006-080069 A | 3/2006 |
| JP | 2006-120521 A | 5/2006 |
| JP | 2015-122213 A | 7/2015 |
| KR | 10-2011-0028391 A | 3/2011 |
| KR | 2011-0065209 A | 6/2011 |
| KR | 10-1219808 B1 | 1/2013 |
| KR | 2014-0109137 A | 9/2014 |
| KR | 2015-0061998 A | 6/2015 |
| KR | 10-2015-0076839 A | 7/2015 |

\* cited by examiner

*Primary Examiner* — Elmito Breval
*Assistant Examiner* — Omar Rojas Cadima
(74) *Attorney, Agent, or Firm* — Mintz Levin Cohn Ferris Glovsky and Popeo, P.C.; Peter F. Corless (57) ABSTRACT

A light guide device that improves the efficiency of backlighting and creates a more uniformly illuminated image is provided. The light guide device includes a first light guide that guides light emitted from a light source and a second light guide component disposed in contact with a surface of the first light guide component to guide incident light incident through the first light guide component. A first optical reflection component is disposed on the surface of the first light guide component to reflect incident light to an adjacent surface of the first light guide component. A second optical reflection component is disposed on a surface of the second light guide component that is adjacent to the first light guide component to reflect incident light through the first optical reflection component to the first light guide component.

5 Claims, 6 Drawing Sheets

FIG. 1

RELATED ART

LIGHT GUIDE DEVICE

CROSS-REFERENCE TO RELATED APPLICATION

This application claims under 35 U.S.C. § 119(a) the benefit of priority to Korean Patent Application No. 10-2015-0145381 filed on Oct. 19, 2015, the entire contents of which are incorporated herein by reference.

BACKGROUND (a) Technical Field

The present disclosure relates to a light guide device, and more particularly, to a light guide device which recycles a portion of incident light, to generate backlight, via a retro-reflection principle, to improve the efficiency of backlighting and to improve uniform illumination of an image.

(b) Background Art

Typically, a vehicle headlamp illuminates the area ahead of a vehicle to ensure safe operation of the vehicle during low light conditions, such as at night. A vehicle headlamp emits light having sufficient illuminance to enable the driver to perceive obstacles positioned ahead of the vehicle. Generally, the headlamp includes a lens, a housing, and a bezel. Recently, vehicle headlamps in the related art may further include a light guide device, mounted within the front edge portion of the bezel to generate backlight.

Figure 1:
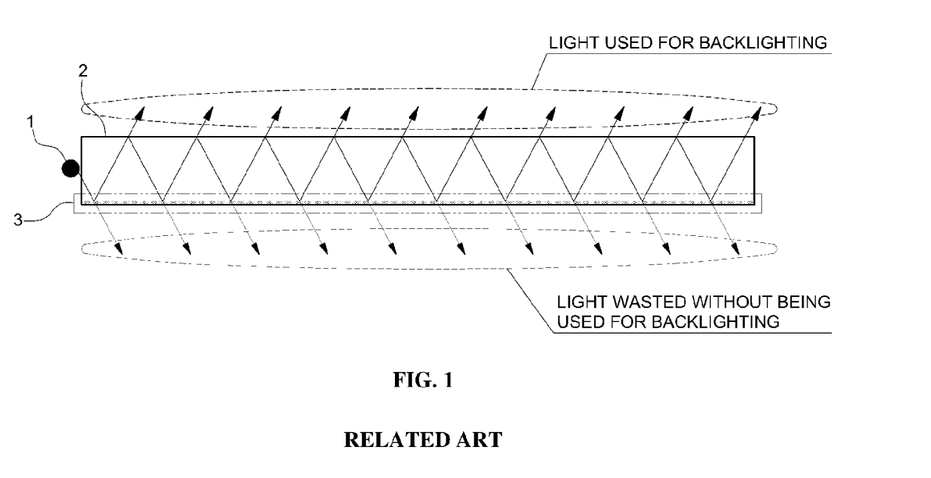
FIG. 1 is an exemplary schematic view illustrating a conventional light guide device according to the related art.

FIG. 1 is an exemplary view that schematically illustrating a conventional light guide device. As shown in FIG. 1, a conventional light guide device includes a light source 1 configured to emit light, a light guide component 2 configured to guide the light emitted from the light source 1, and an optical reflection component 3 disposed at a first surface of the light guide component 2 to reflect the light, incident into the light guide component 2 from the light source 1, to the adjacent surface of the light guide component 2.

In the conventional light guide device, the light emitted from the light source 1 is incident into the light guide component 2 through a first end of the light guide component 2, and is reflected to the adjacent surface of the light guide component 2 by the optical reflection unit 3. The light finally reaches the second end (e.g., the opposite end) of the light guide component 2. The incident light travels into the light guide component 2 through the first end in the longitudinal direction of the light guide component 2 and travels to the second end in the longitudinal direction of the light guide component 2, the light reflected to the adjacent surface of the light guide component 2 provides backlighting. However, the above conventional light guide device reflects a portion of the light incident into the light guide component 2 from the optical reflection component 3 and provides backlighting. However, the remainder of the light passes through the optical reflection component 3 and is not be used for backlighting, and thereby reduces the efficiency of the backlighting.

The above information disclosed in this section is intended merely to aid in the understanding of the background of the invention and therefore it may contain information that does not form the prior art that is already known in this country to a person of ordinary skill in the art.

SUMMARY

The present invention provides a light guide device that recycles a portion of incident light incident which is not used to generate backlight via a retro-reflection principle. Accordingly, the efficiency of and the uniformity in the illumination of the image may be improved.

In one aspect, a light guide device may include a first light guide component configured to guide light emitted from a light source, and a second light guide component disposed in contact with a surface of the first light guide component. The second light guide component may be configured to guide incident light through the first light guide component, and a first optical reflection component may be disposed on a first surface of the first light guide component that may be in contact with the second light guide component. The first optical reflection component may reflect incident light to the adjacent surface of the first light guide component. A second optical reflection component may be disposed on a first surface of the second light guide component adjacent to the first light guide component, and the second optical reflection component may reflect incident light through the first optical reflection component to the first light guide component.

In an exemplary embodiment, the second optical reflection component may include a primary reflection component configured to reflect incident light to the first optical reflection component, and a secondary reflection component that surrounds the primary reflection component. The secondary reflection component may be configured to reflect incident light after penetration of the primary reflection component, to the first optical reflection component. In another exemplary embodiment, the primary reflection component may be formed to have a spherical shape with a circular optical structure in section.

Further, the secondary reflection component may be formed to have a quadrangular column shape with a quadrangular optical structure in section. The secondary reflection component may have an open portion that exposes an upper left portion or an upper right portion of the primary reflection component so that incident light may be reflected into and from the primary reflection component through the exposed portion of the primary reflection component.

In another exemplary embodiment, the secondary reflection component may have a lower protruding portion that extends from an end surface thereof. The end surface may be adjacent to an open portion and may surround a lower end portion of the primary reflection component. The lower protruding portion may be configured to reflect incident light thereinto after penetrating the primary reflection component and may have a quadrangular column shape with a quadrangular optical structure in section.

In a further exemplary embodiment, the secondary reflection component may have a side protruding portion that extends from a side surface thereof. The side surface may be adjacent to an open portion and may surround one of a left portion and a right portion of the primary reflection component, and the side protruding portion may be configured to reflect incident light thereinto after penetrating the primary reflection component and may have a quadrangular column shape with a quadrangular optical structure in section.

Additionally, the light source may be configured to emit incident light into the first light guide component through a first end in a longitudinal direction of the first light guide component. The, the first light guide component and the second light guide component may be an aspherical lens.

BRIEF DESCRIPTION OF THE DRAWINGS

The above and other features of the present invention will be apparent from the following detailed description when taken in conjunction with the accompanying drawings in.

DETAILED DESCRIPTION

Hereinafter reference will now be made in detail to various exemplary embodiments of the present invention, examples of which are referenced to the following detailed descriptions of the exemplary embodiments and illustrated in the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2:
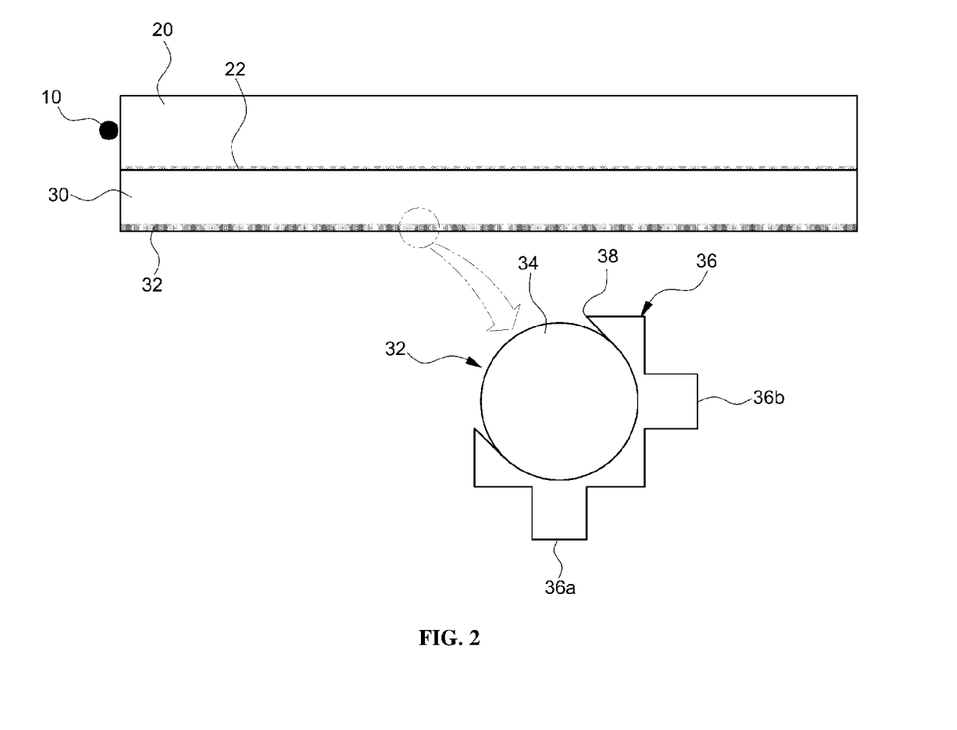
FIG. 2 is an exemplary schematic view illustrating a light guide device according to an exemplary embodiment of the present invention.

As shown in FIG. 2, a light guide device according to an exemplary embodiment of the present invention may be configured to generate backlight by reflecting light incident into the light guide device through the left end or the right end thereof in the longitudinal direction of the light guide device. The light guide device may include a light source 10 configured to emit light, and a first light guide component 20 and a second light guide component 30 configured to guide the light incident thereinto from the light source 10. The light source 10 may be disposed adjacent to a first end of the first light guide component 20, and the incident light may be configured to be emitted from the light source 10 into the first light guide component 20 through a first end of the first light guide component 20. The light source 10 may be embodied as a point light-emitting element, such as an LED.

The first light guide component 20 may be configured to serve to guide the incident light from the light source 10 to pass through the first light guide component 20. The first light guide component 20 may be formed to extend lengthwise in a predetermined direction. The first light guide component 20 may be embodied as an aspherical lens that may include light-transmitting and light-reflecting properties. The second light guide component 30 may be in contact with a first surface of the first light guide component 20 and may be configured to serve to guide the incident light through the first light guide component 20 to pass through the second light guide component 30. The second light guide component 30 may be formed to extend lengthwise in a substantially similar direction as the first light guide component 20, and may be embodied as an aspherical lens that may include light-transmitting and light-reflecting properties.

A plurality of first optical reflection components 22 may be disposed on a bottom surface) of the first light guide component 20, that may be adjacent to the second light guide component 30, to efficiently reflect the light. The first optical reflection components 22 maybe configured to reflect the incident light into the first light guide component 20 from the light source 10 to the second surface (e.g. adjacent, opposite surface, or top surface) of the first light guide component 20. The first optical reflection components 22 may be consecutively arranged and may be connected to one another on a first surface of the first light guide component 20.

For example, the first optical reflection components 22, may be formed to be concave inward into the first light guide component 20 (e.g., to have a recessed structure), or to protrude outward from the first light guide component 20 (e.g., to have a protruding structure). According to the conditions set for reflection of the light from one surface of the first light guide component 20, the first optical reflection components 22 may be designed to include various shapes.

FIG. 2 is an exemplary schematic that shows that the first optical reflection components 22 may be disposed on a first surface of the first light guide component 20, and the structure, shape, position and interval of the first optical reflection components 22 are not limited thereto. The structure, shape, position and interval of second optical reflection components 32 may be disposed within the second light guide component 30, which will be described later. A plurality of second optical reflection components 32 may be disposed on a first surface (e.g., bottom surface) of the second light guide component 30 positioned adjacent to the first surface (e.g., bottom surface) of the first light guide component 20, to recycle the light through the first light guide component 20.

The second optical reflection components 32 may be configured to reflect and return the extraneous light through the first light guide component 20. In other words, the incident light may penetrate the first optical reflection components 22 and may be configured to radiate from the first light guide component 20, to the first light guide component 20 and the first optical reflection components 22. The second optical reflection components 32 may be consecutively arranged and may be connected to one another on a first surface (e.g., bottom surface) of the second light guide component 30.

The second optical reflection components 32 may be disposed at a position adjacent to the first light guide component 20. The incident light passes into the second light guide component 30 after passing through (e.g., penetrating) the first optical reflection components 22 and may reach the second optical reflection components 32 via the interior of the second light guide component 30. Further the second optical reflection components 32 may retro-reflect and return the light to the first light guide component 20 using the optical structure thereof. Accordingly, the amount of light that may be used for backlighting above the first light guide component 20 may be increased, and a clearer backlight image (e.g., light guide image) may be produced.

The concrete sectional structure of the second optical reflection components 32 is illustrated in FIG. 2. As shown in FIG. 2, each of the second optical reflection components 32 may include a primary reflection component 34 configured to reflect the incident light to the first light guide component 20 and the first optical reflection components 22. A secondary reflection component 36, may surround the primary reflection component 34 to reflect the incident light, after the incident light passes through the primary reflection component 34, to the first optical reflection components 22. The primary reflection component 34 may be formed to have a spherical shape with a substantially circular optical structure in section. A portion of the primary reflection component 34, other than the region that accepts the incident light after the incident light passes through the first optical reflection components 22 and reflects the incident light using internal refraction properties, may be surrounded by the secondary reflection component 36. In other words, the region of the primary reflection component 34 that surrounds the secondary reflection component 36 may not accept the light. However, the region of the primary reflection component 34 that may not surround the secondary reflection component 36 accepts the light.

The secondary reflection component 36 may be formed to have a quadrangular column shape with a quadrangular optical structure in section. The secondary reflection component 36 may include an open portion, through which the upper left portion or the upper right portion of the primary reflection component 34 may be exposed. In particular, the incident light may be reflected into and from the primary reflection component 34 through the exposed portion thereof. In other words, the secondary reflection component 36 may include a spherical interior space, which surrounds and accommodates the primary reflection component 34, and an open portion 38 formed at the upper left portion or the upper right portion of the secondary reflection component 36 to expose a portion of the primary reflection component 34.

In some exemplary embodiments, the open portion 38 may be formed in the region at which the top surface and the left surface of the secondary reflection component 36 adjoin each other (e.g., are coupled to each other). The secondary reflection component 36 further has a lower protruding portion 36a that may protrude from the first surface (e.g., bottom surface) thereof and a side protruding portion 36b that may protrude from the right surface thereof. In other words, the lower protruding portion 36a and the side protruding portion 36b may be disposed adjacent to the open portion 38. The lower protruding portion 36a and the side protruding portion 36b may include a quadrangular column shape with a quadrangular optical structure in section.

Described in more detail, to reflect the incident light into the secondary reflection component 36 after the incident light passes through the primary reflection component 34, the lower protruding portion 36a may protrude from the position adjacent to the open portion 38. In particular, the lower protruding portion 36a may protrude from a first end surface (e.g., bottom surface) of the secondary reflection component 36 that surrounds the lower end portion of the primary reflection component 34. The side protruding portion 36b may protrude from the position adjacent to the open portion 38, particularly, from a first side surface (e.g., right surface) of the secondary reflection component 36 that surrounds the left portion or the right portion of the primary reflection component 34.

Moreover, the directions may indicate the surfaces of the secondary reflection component 36. In other words, the top surface, the bottom surface, the left surface, and the right surface, are defined based on FIG. 3, but the positions of the lower protruding portion 36a and the side protruding portion 36b are not limited to the defined directions. The second optical reflection components 32, each having the primary reflection component 34 and the secondary reflection component 36, may be formed from a glass material having light-transmitting and light-reflecting properties, and in some exemplary embodiments may be made of poly methyl methacrylate (PMMA), which has excellent light-transmitting and light-reflecting properties. The first light guide component 20, the second light guide component 30, and the first optical reflection components 22 may also be formed from PMMA.

Figure 3A:
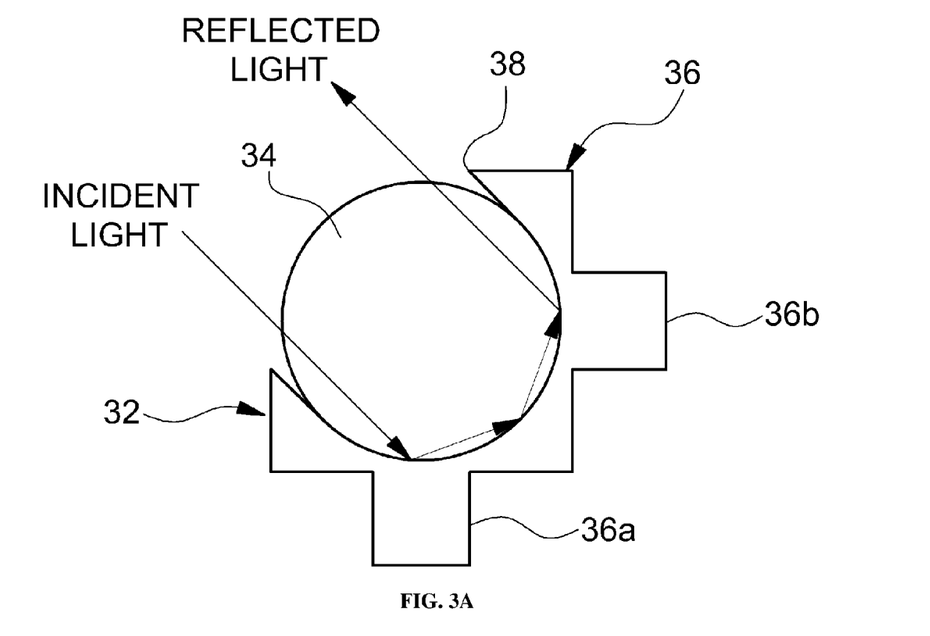
FIGS. 3A-3D are an exemplary views illustrating a route and a direction of movement and reflection of incident light and reflected light in a second optical reflection component of the light guide device according to the exemplary embodiment of the present invention.
Figure 3B:
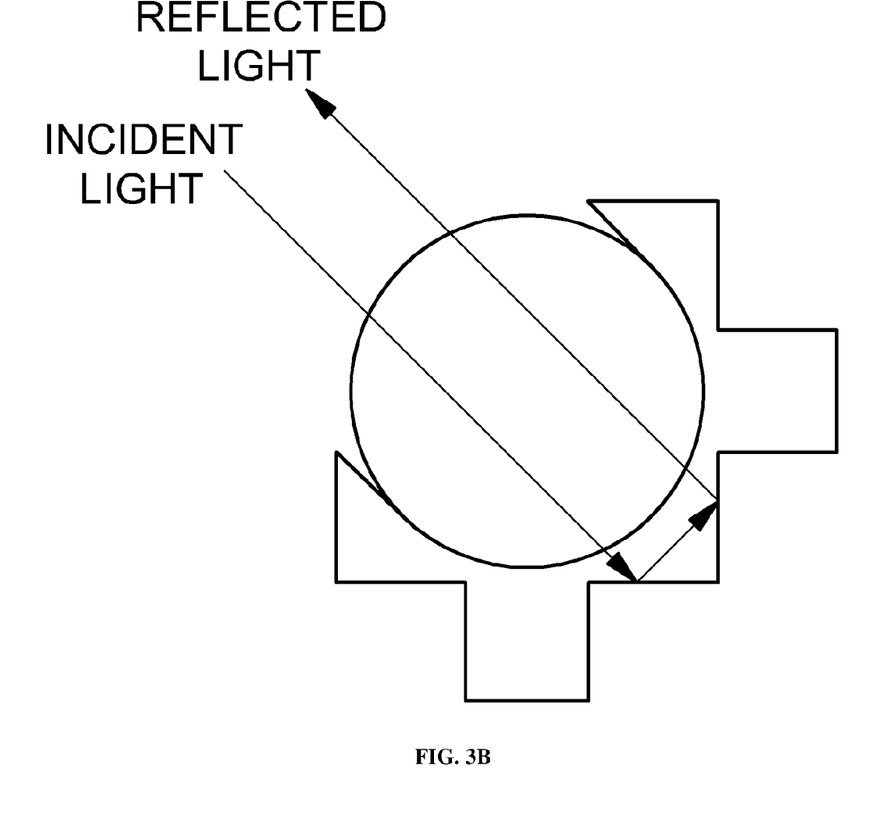
Figure 3C:
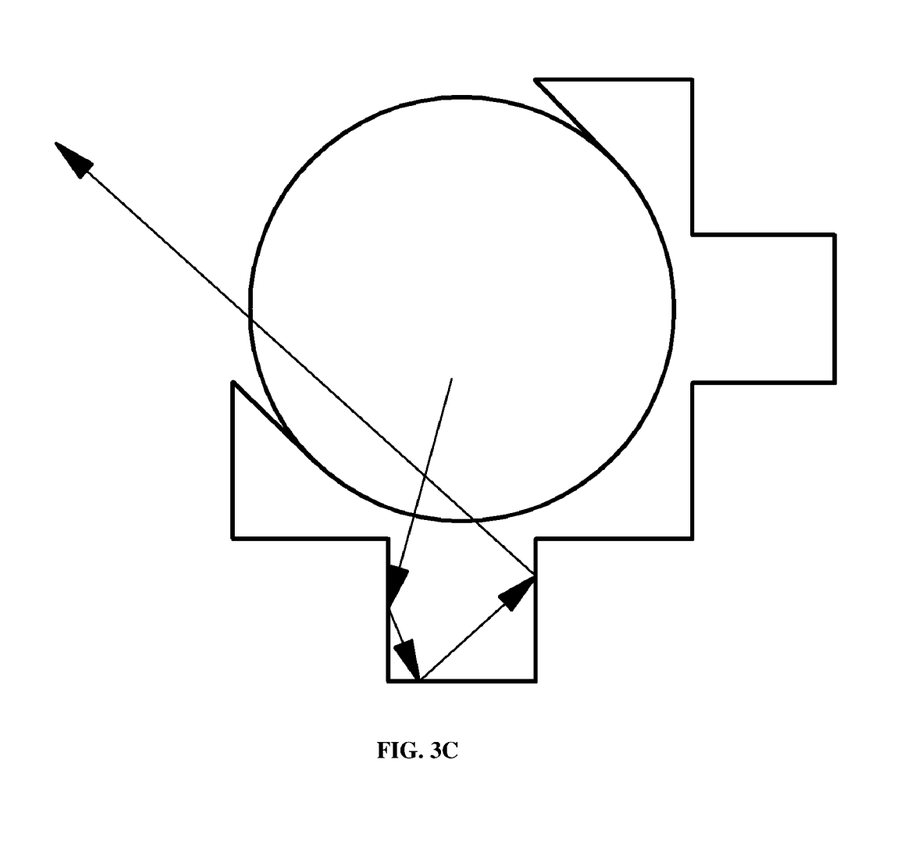
Figure 3D:
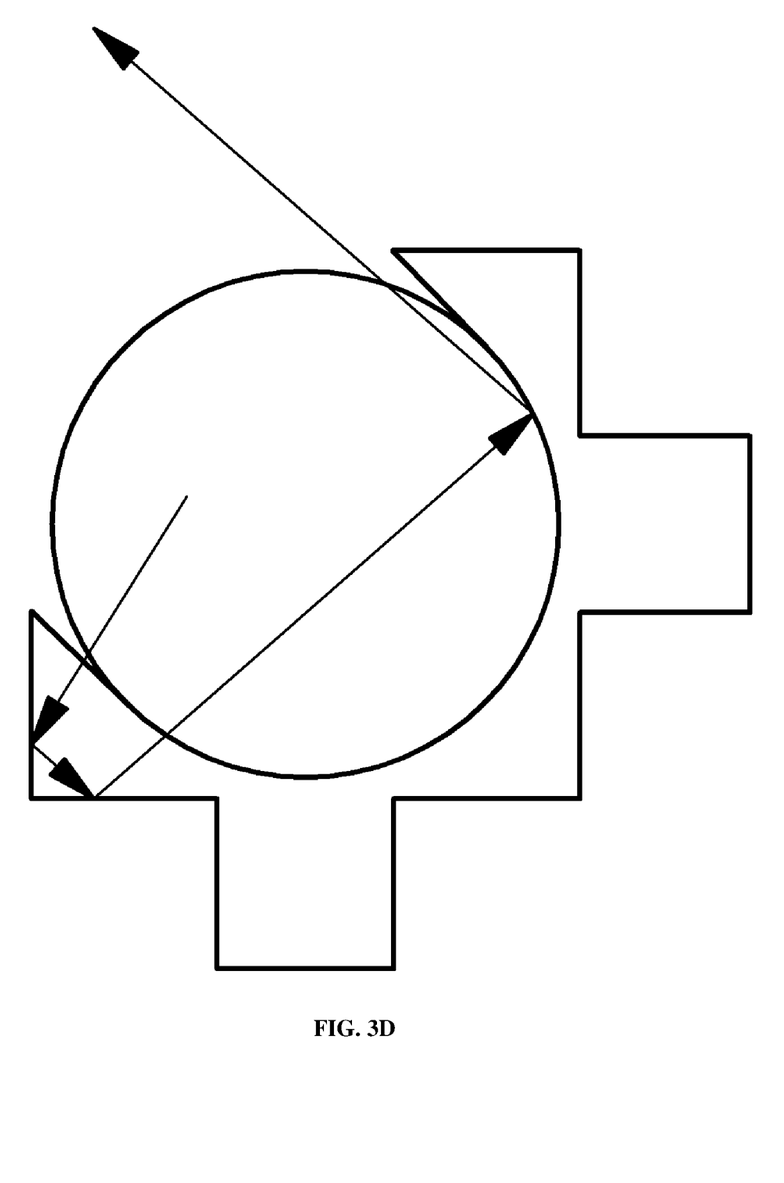

As shown in FIG. 3A, light incident into the second optical reflection component 32 may be incident into the primary reflection component 34. The incident light may be retro-reflected to the first optical reflection component 22 to provide the light that may be reflected and refracted from the regions at which the primary reflection component 34 and the secondary reflection component 36 adjoin and return. As shown in FIGS. 3A, 3B and 3C, the incident light may pass into the primary reflection component 34 without being retro-reflected by the primary reflection component 34, and may be reflected by the secondary reflection component 36, and may return to the first optical reflection component 22. The light that reaches the secondary reflection component 36 may be reflected by the quadrangular optical structure of the secondary reflection component 36 or may be reflected by the quadrangular optical structure of the lower protruding portion 36a and/or the side protruding portion 36b, which protrude from the surfaces of the secondary reflection component 36, thereby returning to the first light guide component 20 and the second light guide component 30.

Figure 4:
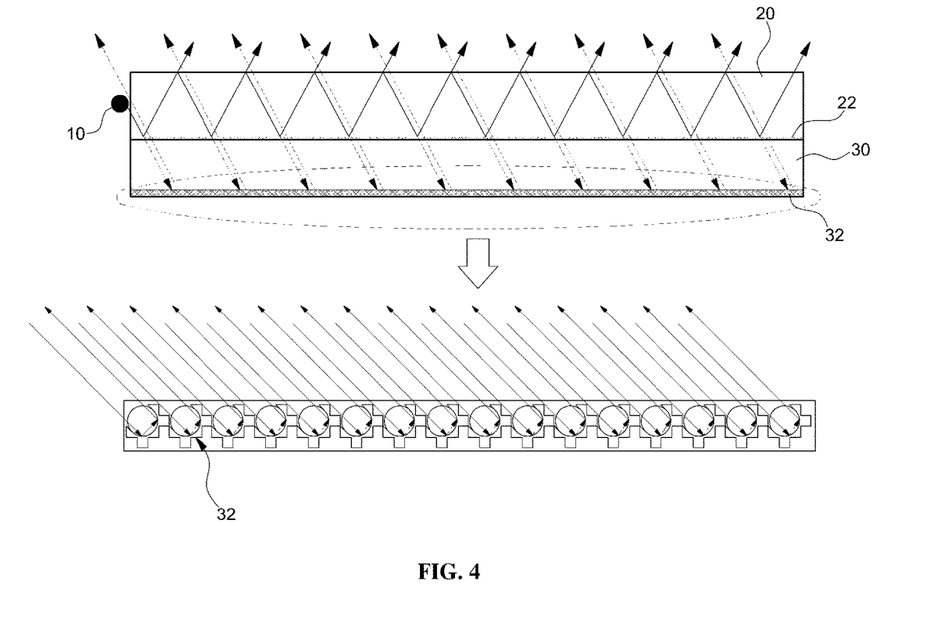
FIG. 4 is an exemplary view illustrating a route and a direction of movement and reflection of light in the light guide device according to the exemplary embodiment of the present invention.

Hereinafter, the light movement and reflection process in the light guide device constituted as above will be explained in more detail with reference to FIG. 4. As shown in FIG. 4, the incident light may be emitted from the light source 10 into the first light guide component 20 through a first end of the first light guide component 20. A portion of the incident light into the first optical reflection components 22 may be reflected and may be configured to move to the second surface (e.g., the opposite surface or top surface) of the first light guide component 20, and the remainder of the incident light may penetrate the first optical reflection components 22 and into the second light guide component 30.

A portion of the light may move to the second surface (e.g., the opposite surface or top surface) of the first light guide component 20 and may be radiated (e.g., released) out of the first light guide component 20 and may form an illumination image (e.g., a light guide image), and the remainder of the light may be reflected into the first light guide component 20. Accordingly, the incident light reflected into the first light guide component 20 may be transmitted substantially in the shape of saw-toothed waves in the first light guide component 20, and may move in the longitudinal direction of the first light guide component 20.

The incident light may pass into the second light guide component 30 and may reach the second optical reflection components 32. The incident light may be reflected by the spherical optical structure (e.g., the primary reflection component) and the quadrangular optical structure (e.g., the secondary reflection component) of the second optical reflection components 32, and may return to the first optical reflection components 22. The light returning to the first optical reflection components 22 may sequentially penetrate the first optical reflection components 22 and the first light guide component 20, and may be released outward through the second surface (e.g., the opposite surface or the top surface) of the first light guide component 20.

Furthermore, the light, which may be retro-reflected to the first optical reflection components 22 and may be released out of the first light guide component 20 via the first optical reflection components 22, may be configured to move in a different direction from the light reflected by the first optical reflection components 22 and released outward (e.g., the light that moves only in the first light guide component 20 and is not incident into the second light guide component 30), and reaches the regions to which a relatively minimal amount of the light reflected by the first optical reflection components 22 may be radiated. Accordingly, a clearer and more uniform backlight image above the first light guide component 20 may be produced.

For example, the light, retro-reflected by the second optical reflection components 32 may be released outward above the first light guide component 20 via the first optical reflection components 22. The light, reflected by the first optical reflection components 22 in the first light guide component 20 may be released outward above the first light guide component 20 and may cross and travel in different directions from each other. In other words, the position of the open portion 38 of the second optical reflection components 32 and the optical structure of the primary reflection component 34 and the secondary reflection component 36 may produce the cross directional travel.

In particular, since the open portion 38 of the second optical reflection components 32 may have the spherical optical structure of the primary reflection component 34 and the quadrangular optical structure of the secondary reflection component 36 may be formed at the upper left portion or the upper right portion of the second optical reflection components 32, the incident light may be reflected into the primary reflection component 34 and/or the secondary reflection component 36 and may travel out of the second optical reflection components 32 via the open portion 38. Accordingly, a substantial amount of light reflected by the second optical reflection components 32 may travel in a diagonal direction that crosses the direction in which the light reflected by the first optical reflection components 22 travels.

The above-described light guide device of the present invention may improve the efficiency of backlighting and may produce a uniformly illuminated image. For example the light that is not used for backlighting in a conventional light guide device having only a first light guide component and first optical reflection components may be recycled. As is apparent from the above description, the present invention provides a light guide device, which recycles light, s not used for backlighting in a conventional light guide device, using a retro-reflection principle. Accordingly, a clearer illumination image (e.g., light guide image) may be produced than a conventional light guide device that includes a light source (e.g., LED) having the same specifications.

Further, even though fewer light sources are used in the exemplary light guide device, an illumination image having the same quality as an illumination image generated using a conventional light guide device may be generated, which decreases manufacturing costs. Furthermore, using a retro-reflection principle, the light guide device of the present invention may produce light reflection in a direction that crosses a direction in which light incident into a light guide component in a conventional light guide device is reflected, thereby creating a more uniformly illuminated image.

The invention has been described in detail with reference to what is presently considered to be exemplary embodiments, it is to be understood that the invention is not limited to the disclosed exemplary embodiments. On the contrary, it is intended to cover various modifications and equivalent arrangements without departing from the principles and spirit of the invention, the scope of which is defined in the appended claims and their equivalents.

What is claimed is:

1. A light guide device, comprising:
a first light guide component configured to guide light emitted from a light source;
a second light guide component disposed in contact with a surface of the first light guide component, the second light guide component configured to guide incident light through the first light guide component;
a first optical reflection component disposed on the surface of the first light guide component that contacts the second light guide component, the first optical reflection component configured to reflect incident light to an adjacent surface of the first light guide component; and
a plurality of second optical reflection components disposed on a surface of the second light guide component adjacent to the first light guide component, the second optical reflection components configured to reflect incident light through the first optical reflection component to the first light guide component,
wherein the second optical reflection components are consecutively arranged on the surface of the second light guide component,
wherein the second optical reflection components include a primary reflection component configured to reflect incident light to the first optical reflection component, and a secondary reflection component that surrounds the primary reflection component, the secondary reflection component is configured to reflect incident light, that passes through the primary reflection component, to the first optical reflection component,
wherein the primary reflection component is formed to have a spherical shape having a circular optical structure in section,
wherein the secondary reflection component is formed to have a quadrangular column shape having a quadrangular optical structure in section,
wherein the secondary reflection component has an open portion to expose an upper left portion or an upper right portion of the primary reflection component to provide incident light into and reflected from the primary reflection component through the exposed portion of the primary reflection component.

2. The light guide device of claim 1, wherein the secondary reflection component has a lower protruding portion that extends from an end surface thereof, the end surface is positioned adjacent to an open portion and surrounds a lower end portion of the primary reflection component, and the lower protruding portion is configured to reflect incident light that passes through the primary reflection component and has a quadrangular column shape with a quadrangular optical structure in section.

3. The light guide device of claim 1, wherein the secondary reflection component has a side protruding portion that extends from a side surface, the side surface positioned adjacent to an open portion and surrounds one of a left portion and a right portion of the primary reflection component, and the side protruding portion reflects incident light that passes through the primary reflection component and has a quadrangular column shape with a quadrangular optical structure in section.

4. The light guide device of claim 1, wherein the light source emits incident light into the first light guide component through a first end in a longitudinal direction of the first light guide component.

5. The light guide device of claim 1, wherein the first light guide component and the second light guide component are an aspherical lens.

* * * * *